United States Patent

Hemdal

[15] 3,668,646

[45] June 6, 1972

[54] METHOD OF CONTROLLING JUMPS TO DIFFERENT PROGRAMS IN A COMPUTER WORKING IN REAL TIME

[72] Inventor: Göran Anders Henrik Hemdal, Tyreso, Sweden

[73] Assignee: Telefonaktiebolaget LM Ericsson, Stockholm, Sweden

[22] Filed: June 10, 1970

[21] Appl. No.: 45,110

[30] Foreign Application Priority Data

June 17, 1969 Sweden ..................... 8586/69

[52] U.S. Cl. .................... 340/172.5

[51] Int. Cl. .................... G06f 9/18

[58] Field of Search ............ 340/172.5; 235/157

[56] References Cited

UNITED STATES PATENTS

| | | | |
|---|---|---|---|
| 3,373,408 | 3/1968 | Ling | 340/172.5 |
| 3,440,612 | 4/1969 | Womack | 340/172.5 |
| 3,359,544 | 12/1967 | Macon et al. | 340/172.5 |
| 3,480,916 | 11/1969 | Belt et al. | 340/172.5 |
| 3,483,522 | 12/1969 | Figueroa | 340/172.5 |

*Primary Examiner*—Paul J. Hehon
*Assistant Examiner*—Mark Edward Nusbaum
*Attorney*—Hane, Baxley & Spiecens

[57] ABSTRACT

The invention refers to a method of controlling jumps to different programs in a computer which works in real time. A number of programs associated with different priority levels are performed sequentially within subsequent primary intervals determined by a clock register. The programs associated with the different priority levels have to be addressed in periodically recurrent intervals of different length. After having performed a program a sum value is formed by addition of the contents of the clock register and a number corresponding to the number of subsequent primary intervals within which the addressing of the program has to be omitted. Within each primary interval the actual value of the clock register in priority order is compared with the sum values associated with the respective programs. If the value of the clock register upon comparison is found to have passed a sum value that one of the programs is addressed with which said sum value is associated.

3 Claims, 5 Drawing Figures

Figure 1:
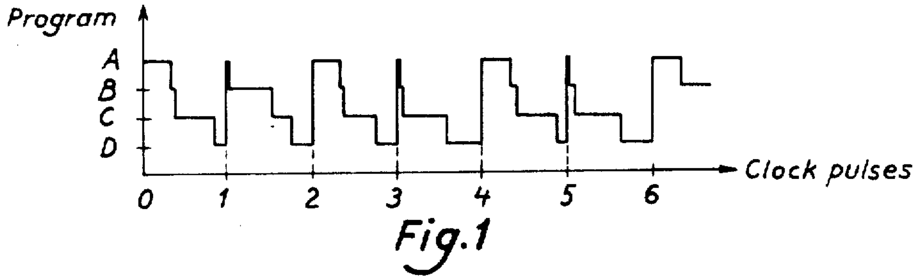

INVENTOR
GÖRAN ANDERS HENRIK HEMDAL

BY Hane, Baxley & Spiecens
ATTORNEYS

INVENTOR

Görän Anders Henrik Hemdal

BY Hane, Baxley & Spiecens
ATTORNEYS

METHOD OF CONTROLLING JUMPS TO DIFFERENT PROGRAMS IN A COMPUTER WORKING IN REAL TIME

The present invention refers to a method of controlling jumps to different programs in a computer which works in real time and in which a number of programs associated with different priority levels are performed sequentially within subsequent primary intervals determined by a clock register and in which computer the programs associated with the different priority levels have to be addressed in periodically recurring intervals of different lengths.

In a computer working in real time there are a number of different programs which have different so-called priority levels. The operation of the central processing unit is controlled by a clock register which is stepped forward by a pulse generator in such a manner that upon each stepping forward the operation begins at the highest priority level, after which successively lower priority levels are dealt with. There is a danger that not all programs can performed completely during the time between two clock pulses, a so-called primary interval. It is not necessary that all programs are performed during each primary interval since the length of the primary interval must be adapted to the time interval in which the most often treated programs must be performed. Certain programs consequently need only be executed during each second or each third primary interval or during a still longer period of time. In a program memory controlled telecommunication equipment there are a great number of programs which scan different devices in the equipment to determine their state, so that the time between different condition or state changes of the devices can be determined. How often the programs must be executed is defined by the accuracy required for such time measurements. In order to carry out jumps to different programs having different intervals and priorities a number of different methods have been developed. A first method described in Bell Technical System Journal, Vol. 43, September 1964 teaches that a number of memory fields are cyclically scanned in such a manner that after each stepping forward of the clock register one scanning is carried out. A definite bit position corresponds to the same program in all the memory fields and a bit set to one-condition indicates that the corresponding program has to be dealt with. This method necessitates however a very great memory extent since the number of bits in each field is as great as the number of programs and the number of memory fields corresponds to the number of primary intervals in the longest period time. A further drawback is that if, during a primary interval, there is not sufficient time to investigate all the bits, a one-set bit cannot be detected before the next memory field, in which a jump is marked, will be investigated, i.e. the period time will at least be doubled which normally implies that the execution of the program gives erroneous information. A further known method implies that within each primary interval a counter associated with each program is investigated in turn and upon each scanning these counters are decremented by one step and when the decremented finally results in the zero-setting of the counter a jump to the corresponding program is carried out. When the program has been performed the counter is set to a value corresponding to the number of primary intervals which have to pass until the next jump to the program has to be carried out. This method necessitates less memory space than the first described method and the danger of great prolongations of the program periods will be less. The drawback is however that the stepping down of all the counters in each primary interval causes a great work load for the computer and there is a risk that the counters associated with programs having low priority levels do not have sufficient time to be stepped backwards within each interval. For this reason programs in which great accuracy of time is necessary must be associated with high priority levels even if they must be performed relatively seldom. A further disadvantage is that there is no possibility to have programs which normally do not have to be executed since a program is always performed as soon as the associated counter has been stepped to zero. An object of the present invention is thus to provide a method and apparatus for controlling jumps to the different programs in which method the work load and the time delay in programs of low priority levels is substantially decreased relatively to the methods described hereabove.

Figure 5:
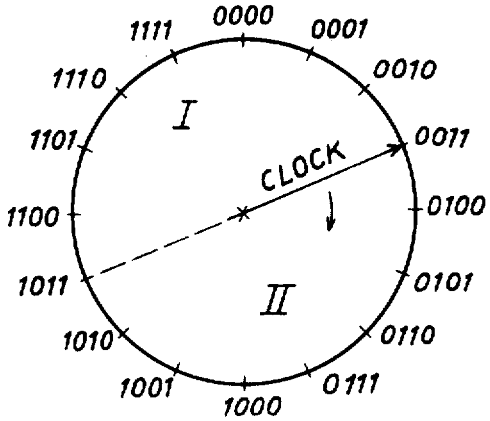

The characterizing features of the invention appear from the appended claims. The invention will be described more in detail with reference to the accompanying drawing in which FIG. 1 shows diagrammatically how different programs are executed during subsequent primary intervals determined by clock pulses, FIG. 2 is a table showing those intervals within which programs must be performed, FIG. 3*a* shows a memory field necessary for calling in different programs, FIG. 3*b* shows how the contents of said memory fields are influenced when a jump to the program is carried out according to a known method, FIG. 4 shows an example of an arrangement according to the invention and FIG. 5 shows a diagram by means of which one of the functions of the arrangement according to FIG. 4 can be explained.

In FIG. 1 there is shown how four different programs A, B, C and D are called in during different primary intervals which are determined by clock pulses marked on the abscissa. The programs have in this manner a priority in alphabetical order, i.e. after a clock pulse it is investigated whether the program A must be executed, , after which the program B is investigated in a corresponding manner and so on. It is assumed that the programs must be executed in those intervals which for the respective program have been marked by X in FIG. 2. FIG. 2 is a table showing which of the programs is to be executed in which of the time intervals. The program A should thus be executed each second interval, the program B each fifth interval, the program C each interval and the program D each third interval. As it appears from FIG. 1 a certain time is also necessary to determine whether a program is to be performed or not and to perform procedures as a result of this determination.

Figure 3A:
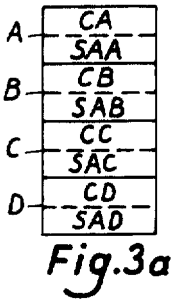

FIG. 3*a* shows the memory fields belonging to the programs A, B, C, and D, each field including a counting field CA, CB, CC and CD respectively, and a starting address SAA, SAB, SAC and SAD of the respective program. These memory fields are used in such a manner that after each clock pulse counters are investigated sequentially, and, if one of the counters is zero-set, a jump is carried out to the corresponding program by means of the associated starting address while the counter, if it is not zero-set, is stepped downwards by one and the next counting field is investigated. If a jump is carried out according to the known method, then after the program has been executed, a number corresponding to the number of clock pulses which must occur before the next jump is registered in the counter. FIG. 3*b* shows the contents of the counting fields obtained in this manner as a function of the clock pulses. As mentioned before this method has a number of drawbacks. In order to obtain correct calling in intervals it is assumed that there is sufficient time to process all the counting fields within each primary interval or else no stepping backward of the counting fields can be carried out. As normally this is not the case, the accuracy of the time period will diminish with decreasing priority level, which implies that programs in which there are high requirements on accuracy of time, have to be placed on high priority levels, even if the programs have to be called in very seldom. The stepping backward of all the counters during each interval causes furthermore a considerable permanent load on the processor.

Figure 2:
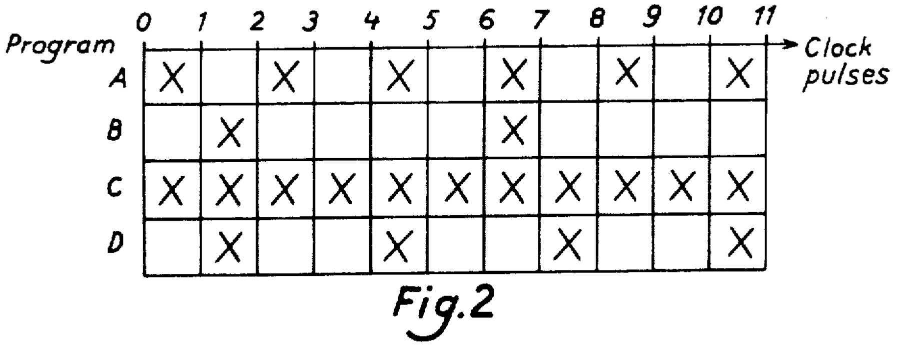
Figure 3B:
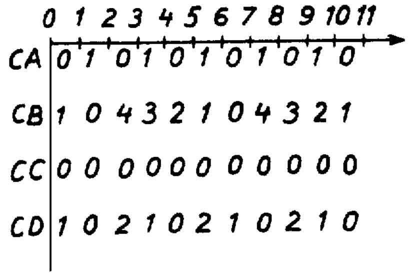
Figure 4:
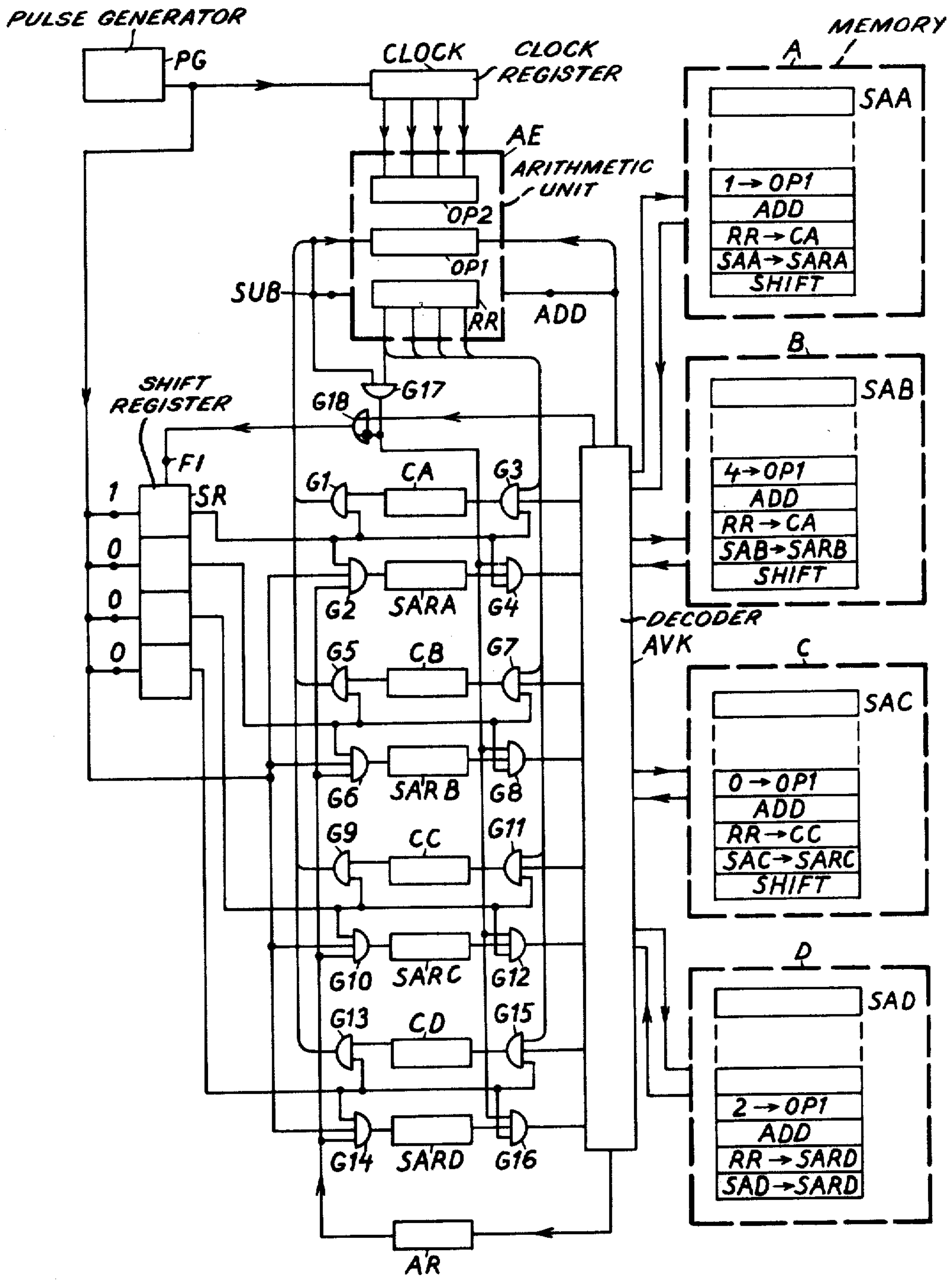

FIG. 4 shows an arrangement according to the invention wherein four programs designated by A, B, C and D should be called in during the intervals shown in FIG. 2. By CA, CB, CC and CD are designated memory fields, the object of which is to bring about the same function as the corresponding memory field in FIG. 3*a*. This is carried out according to the invention in a different manner than described hereabove. The registers SARA, SARB, SARC and SARD correspond to the starting address memory cells in FIG. 3*a*. FIG. 4 shows furthermore a pulse generator PG which produces the above mentioned clock pulses and steps forward a clock register CLOCK. The arrangement according to FIG. 4 includes furthermore an arithmetic unit AE of known type, a shift register SR for successive selecting of the memory cells CA-CD, a decoder AVK which for example may consist of a passive diode network, an address register AR, in which the address is stored which each time is addressed in the programs A-D, and furthermore the figure includes a number of AND-gates G1–G17 and an OR-gate G18 whose functions will be explained more in detail by means of the following description of the arrangement. When a clock pulse is obtained from the pulse generator PG the clock register CLOCK is stepped forward and obtains a new value. The different values which the clock register can have if the number of bits is 4, is shown in FIG. 5 which is a time diagram in which the clock register has the value 0011 according to the example. The new value of the clock register is transferred to an operand register OP2 in the arithmetic unit AE and furthermore the shift register SR is preset by the impulse generator PG in such manner that AND-gates G1–G4 associated with the memory cells CA and SARA can be opened. In the register CA there is stored a number which is determined in such manner that when the value of the clock register exceeds said number, the associated program, i.e. the program A, must be performed. How this number is obtained in the register will be explained more in detail. When the gate G1 is opened, said number will be transferred to an operand register OP1 in the arithmetic unit AE. In addition, an operand input SUB of unit AE is activated. Such activating causes the subtraction of the contents of the register OP2, the subtrahend, from the contents of the register OP1, the minuend. The subtraction is carried out in known manner by complementing the subtrahend and increasing it by one, after which it is added to the minuend. If the value of the minuend is between 1011 and 0010, i.e. the last eight values occupied by the clock register (corresponding to the range I in FIG. 5), the subtraction will result in obtaining one in the most significant position in a result register RR of the arithmetic unit, while in the opposite case zero is obtained. A resulting one is interpreted in such manner that the clock register has passed the value at which a jump to the program A should be carried out while a resulting zero indicates that said value has not yet been passed. If a zero is obtained in this manner, this causes a stepping forward input FI of the shift register SR to be activated through the AND-gate G17 and the OR-gate G18. The shift register is stepped forward and the gates G5–G8 of the memory cells CB and SARB associated with the program B are opened. After this the same operations are repeated as before for the contents of said memory cells. If, however, instead a one is obtained in the most significant position of the register RR, the gate G4 will be opened causing the contents of the memory cell SARA to be read out to the decoder AVK. This memory cell contains the starting address of the program A and said address will be addressed through the decoder and the program A will be performed. By means of the last instructions of this program the following is accomplished first the digit 1 will be transferred to the operand register OP1 as shown in the drawing due to the fact that the program has to be passed through during each second primary interval. An operation input ADD of the arithmetic unit is activated thereafter and the sum of this number and the value of the clock register is obtained in the result register RR and transferred to the memory cell CA. This will cause a jump to the program A to be carried out again as soon as said memory contents are investigated, after that the clock register has been stepped forward two steps, i.e. the program A will be called in according to FIG. 2. It has to be observed furthermore that, especially if programs having lower priority level (for example the programs C and D) are dealt with, there is a risk that a clock pulse will be obtained from the pulse generator PG during the time the program is treated, causing the shift register to be set to its original condition and the program treating is interrupted. The address at which the interruption is carried out has to be stored of course so that it will be possible to continue at this address during the next primary interval. In order to obtain this result the address register AR in which the address of the next instruction to be performed is connected through the AND-gates G2, G6, G10 and G14 connected to the starting address registers SARA-SARB, so that if a pulse is obtained from the pulse generator PG the actual address is obtained in the respective starting address register. Consequently, for the case when a program has been interrupted, in the next interval, the program will be continued where the interruption has occurred. For this reason there is at the end of each program an instruction by means of which the starting address of the program in recorded in the associated starting address register. Furthermore each program is terminated (with the exception of program D) by an instruction for stepping forward the shift register SR.

The advantages which are obtained by the arrangement hereabove described are the following. First, it is not necessary to reset the memory cells CA-CD which operate as counters, in each primary interval. Consequently the constant load will decrease. Secondly, it is of no importance if, during a certain primary interval, there has not been sufficient time to investigate the memory cell associated with a program which need not be executed during said interval. Thirdly, the arrangement has the advantage that, if there is not sufficient time to execute a program during the primary interval during which this should be carried out, the program will be dealt with as soon as the time within an interval will allow this.

We claim:

1. The method of controlling jumps to different programs in a computer operating in real time and in which a number of programs associated with fixed allocated priority levels are sequentially handled within primary intervals as determined by a clock register, the programs associated with the different priority levels being addressed in periodically recurrent intervals of constant length comprising the steps of:

executing a program, forming a sum value by addition of the contents of said clock register and a number corresponding to the number of subsequent primary intervals within which the selection of said program must be omitted after said program has been executed, during each primary interval, establishing a priority order for said programs, comparing the actual value of said clock register with the sum value associated with each of the respective programs in said priority order for indicating whether the value of said clock register has passed a predetermined sum value, and, if such a passing has occurred, selecting the associated program in order to execute the same.

2. The method as claimed in claim 1, wherein said comparing comprises subtracting the contents of said clock register from said number in a binary form and the passing of said value is indicated by the most significant bit of the comparison result being a particular binary value.

3. In a computer operating in real time wherein a plurality of programs associated with different priority levels are sequentially executed within primary intervals, the programs associated with the different priority levels being selected at times which are different multiples of a primary interval, apparatus for controlling jumps to said programs comprising: a pulse generator for emitting pulses defining said primary intervals, a clock register for accumulating said pulses for counting said primary intervals, a memory including a plurality of memory fields, each of said memory fields being associated with a different one of said programs, each of said memory field means including a first register for storing a clock register value which determines the primary interval during which the next selection of the associated program is to be performed after a previous selection and a second register for storing the starting address of the associated program, a decoder means having a plurality of inputs and outputs, an arithmetic unit comprising a first operand register connected to said clock register for storing the instantaneous value of said clock register, a second operand register, a result register, means responsive to a compare control signal for performing a comparison between the contents of operand registers and for storing the results thereof in said result register, and means responsive to an add control signal for adding the contents of said operand registers and storing the sum thereof in said result register, means for generating said compare control signal, a multi-stage shift register including a presetting input connected to said pulse generator for setting the shift register to a particular stage, a step input for stepping the shift to the next stage of the sequence, and an output associated with each stage, each stage of said shift register being associated with a different one of said programs, means connected to the outputs of the stages of said shift register for transferring the contents of the said first register associated with the output of the stage of said shift register which is activated to said second operand register, means connected to the outputs of the stages of said shift register and responsive to said add control signal for transferring the contents of said result register to the one of said first registers associated with the stage of said shift register which is activated, comparison-result indicating means connected to said result register and responsive to said compare signal for generating a first control signal when the contents of said second operand register is greater than the contents of said first operand register and a second control signal when they are not, means responsive to the presence of said first control signal for transferring the contents of the second register associated with the then activated stage of said shift register to an input of said decoder means, means responsive to the presence of said second control signal for transmitting a pulse to the stepping input of said shift register whereby said first register of the subsequent memory field is selected to transfer its contents to said second operand register, an addressed memory for storing each of the programs in a different sequence of memory registers, storage means associated with each of said sequences for storing a number related to the number of primary intervals which must elapse before the associated program is to be performed, said decoder means including means operative upon receipt of a starting address from one of said second registers to initiate the operation of the program associated therewith and said decoder means further including means for transferring the contents of the said storage means of the said program to said operand register and generating said add signal.

* * * * *